2,824,081

POLYVINYL CHLORIDE COMPOSITIONS CONTAINING A UREA-LOWER ALKYL MONOPHOSPHATE REACTION PRODUCT AS A LIGHT STABILIZER

Marvin A. McCall and Richard L. McConnell, Kingsport, Tenn., assignors to Eastman Kodak Company, Rochester, N. Y., a corporation of New Jersey No Drawing. Application November 17, 1955
Serial No. 547,544

5 Claims. (Cl. 260—45.9)

This invention relates to polyvinyl chloride compositions containing light stabilizers. More particularly, it relates to polyvinyl chloride compositions containing, as light stabilizers, the reaction products of urea with the lower alkyl monophosphates. These lower alkyl monophosphates are sometimes termed alkyl phosphoric acids.

Exposure of polyvinyl chloride to heat or light results in discoloration and a loss in physical properties. Although some stabilizers for polyvinyl chloride have been reported in the literature, they have certain disadvantages such as noncompatibility, high toxicity, short action, etc. Heat stabilizers for polyvinyl chloride are generally epoxide type compounds or metal salts of long chain fatty acids. Metal salts such as dibutyltin dilaurate, dibutyltin maleate, dibutyldiphenyltin, calcium acetoacetate, and Dyphos [$2PbO.PbHPO_3.½H_2O$] have both heat and light stabilizing action in polyvinyl chloride. Both heat and light stabilizers are required for polyvinyl chloride and frequently synergistic effects are noted. The following references give a more detailed description of the mechanism of degradation and the effectiveness of some of the above stabilizers: Smith, Plastics [London], 17, 264–6 [September 1952]; Scarbrough et al., Modern Plastics, 29, 111 [May 1952]; Fox et al., Industrial and Engineering Chemistry, 41, 1774 [1949].

It is an object of our invention to provide polyvinyl chloride compositions of improved light stability.

We have found that products derived from the reaction of 1 mol of a lower alkyl mono-ester of orthophosphoric acid with 2 mols of urea have excellent light stabilizing action on polyvinyl chloride. These reaction products may be prepared by heating a lower alkyl monoester of orthophosphoric acid with urea in a nitrogen atmosphere. Commercially available alkyl phosphoric acids (which contain approximately equimolar amounts of mono and dialkyl phosphoric acids) may also be used in the reaction with urea to give products which are valuable light stabilizers.

EXAMPLE 1

Monomethyl phosphate-urea reaction product. When 22.4 g. of monomethyl phosphate and 24.0 g. of urea were mixed, a slight exothermic reaction was noted. This mixture was heated at 120–155° C. for a 4-hour period under nitrogen. The product was a water-white, almost solid resinous material.

Monopropyl phosphate and mono-octyl phosphate each reacted similarly with urea, to give viscous, transparent products.

The urea-lower alkyl monophosphate reaction products prepared according to Example 1 impart long lasting light stability to polyvinyl chloride when incorporated in concentrations ranging from 0.1 to 10.0% . Vinyl chloride copolymers containing acrylonitrile, methacrylonitrile, vinylidene chloride, alkyl acrylates and methacrylates, alkyl maleates and fumarates, etc., may also be stabilized. These phosphorus containing products may be incorporated into the polyvinyl chloride by any of a variety of conventional methods. If polyvinyl chloride containing the above-described products is processed without an added heat stabilizer, the samples are discolored. These samples are bleached, however, by short exposure to light and remain colorless thereafter for long periods of exposure. Samples processed with a suitable heat stabilizer are colorless from the beginning and remain colorless for long periods of exposure to light.

Polyvinyl chloride compositions for testing were prepared by rolling 100 parts by weight of polyvinyl chloride (B. F. Goodrich Geon 101) with 30 parts by weight of dioctyl phthalate as plasticizer, and 4 parts by weight of the urea-monoalkyl phosphate reaction product prepared as described above. For comparison, a sample was prepared and tested containing, in place of the urea-monoalkyl phosphate reaction product, the same amount of dibutyl tin dilaurate. A sample containing no stabilizer was also tested. In testing the compositions, compression-molded samples, 2.5" x 0.5" x 0.050", were exposed at a black panel temperature of 150° F. in a modified DL-TS Atlas Twin-Arc Weather-Ometer set on the 51 min.: 9 min. dry: wet cycle with the sample drum revolving once a minute. The modification of the Weather-Ometer consisted in the addition of 12 Westinghouse 20-watt fluorescent sun lamps, mounted vertically at a distance of about 2 inches from the sample drum. A similar modification of the Weather-Ometer involving 8 sun lamps was described in detail in a paper by J. W. Tamblyn and G. M. Armstrong, entitled "A Modification of the Atlas Twin-Arc Weather-Ometer," in Analytical Chemistry, 25, 460–5 (1953). Table I shows the results of these tests, the results being given in number of hours of exposure before the sample became discolored.

Table I

| Sample | Stabilizer | Hours to Discoloration |
|---|---|---|
| 1 | None | 100 |
| 2 | Dibutyl tin dilaurate | 450 |
| 3 | Methylphosphoric Acid-Urea Product | 900 |
| 4 | Propylphosphoric Acid-Urea Product | 800 |

What we claim as our invention and desire to be secured by Letters Patent of the United States is:

1. A polyvinyl chloride composition stabilized against deterioration by light by a content of from 0.1% to 10% by weight, based on the weight of polyvinyl chloride, of the reaction product prepared by heating 1 mol of a lower alkyl mono-ester of orthophosphoric acid with 2 mols of urea.

2. A polyvinyl chloride composition stabilized against deterioration by light by a content of from 0.1% to 10% by weight, based on the weight of polyvinyl chloride, of the reaction product prepared by heating 1 mol of monomethyl orthophosphate with 2 mols of urea.

3. A polyvinyl chloride composition stabilized against deterioration by light by a content of from 0.1% to 10% by weight, based on the weight of polyvinyl chloride, of the reaction product prepared by heating 1 mol of monopropyl orthophosphate with 2 mols of urea.

4. A polyvinyl chloride composition stabilized against deterioration by light by a content of approximately 4% by weight, based on the weight of polyvinyl chloride, of the reaction product prepared by heating 1 mol of monomethyl orthophosphate with 2 mols of urea.

5. A polyvinyl chloride composition stabilized against deterioration by light by a content of approximately 4% by weight, based on the weight of polyvinyl chloride, of the reaction product prepared by heating 1 mol of monopropyl orthophosphate with 2 mols of urea.

References Cited in the file of this patent

UNITED STATES PATENTS

| | | |
|---|---|---|
| 2,587,549 | Trematozzi | Feb. 26, 1952 |
| 2,668,096 | Reeves et al. | Feb. 2, 1954 |
| 2,728,790 | Sroog | Dec. 27, 1955 |

FOREIGN PATENTS

| | | |
|---|---|---|
| 671,647 | Great Britain | May 7, 1952 |